United States Patent [19]

Penn

[11] 4,350,803

[45] Sep. 21, 1982

[54] REACTION ARRESTMENT MIXER HEAD AND MIXING PROCESS

[75] Inventor: Laurence R. Penn, Mentor on the Lake, Ohio

[73] Assignee: Liquid Control Incorporated, Silver Spring, Md.

[21] Appl. No.: 286,755

[22] Filed: Jul. 27, 1981

Related U.S. Application Data

[60] Continuation of Ser. No. 107,612, Dec. 27, 1979, abandoned, which is a division of Ser. No. 965,709, Nov. 30, 1978, abandoned.

[51] Int. Cl.³ ............................................. C08G 85/00
[52] U.S. Cl. ........................................ 528/10; 528/44; 528/86; 528/87; 528/272; 528/335; 528/373; 528/403; 526/71; 525/10
[58] Field of Search ............... 528/44, 10, 86, 87, 528/272, 335, 373, 403; 526/71; 525/10

[56] References Cited

U.S. PATENT DOCUMENTS

| | | | |
|---|---|---|---|
| 3,243,128 | 3/1966 | Tight | 366/149 |
| 3,358,749 | 12/1967 | Chisolm | 366/149 |
| 3,405,098 | 10/1968 | Heighton et al. | 526/71 |
| 3,583,678 | 6/1971 | Harder | 366/340 |
| 3,679,635 | 7/1972 | Portus | 528/335 |
| 3,884,881 | 5/1975 | Bice et al. | 528/335 |
| 4,110,521 | 8/1978 | Barnett | 422/135 |

*Primary Examiner*—Harold D. Anderson
*Attorney, Agent, or Firm*—Wenderoth, Lind & Ponack

[57] ABSTRACT

A mixer mixes at least two fluid components of the type which when mixed together undergo chemical reaction to form a solid or semi-solid reaction product. The components are separately introduced into the mixer, whereat they are mixed, and the reaction mixture is discharged from the mixer prior to the completion of the chemical reaction and while still in a fluid state. When desired, for example when it is necessary to shut down the operation of the mixer, the chemical reaction in the mixer is arrested by selectively cooling the reaction mixture down to a temperature at which the chemical reaction will not occur or will at least be retarded. This prevents the formation of the reaction product within the final mixer. Thereafter, for example when the operation of the mixer is again commenced, the reaction mixture is reheated to an increased temperature at which the chemical reaction will continue.

4 Claims, 2 Drawing Figures

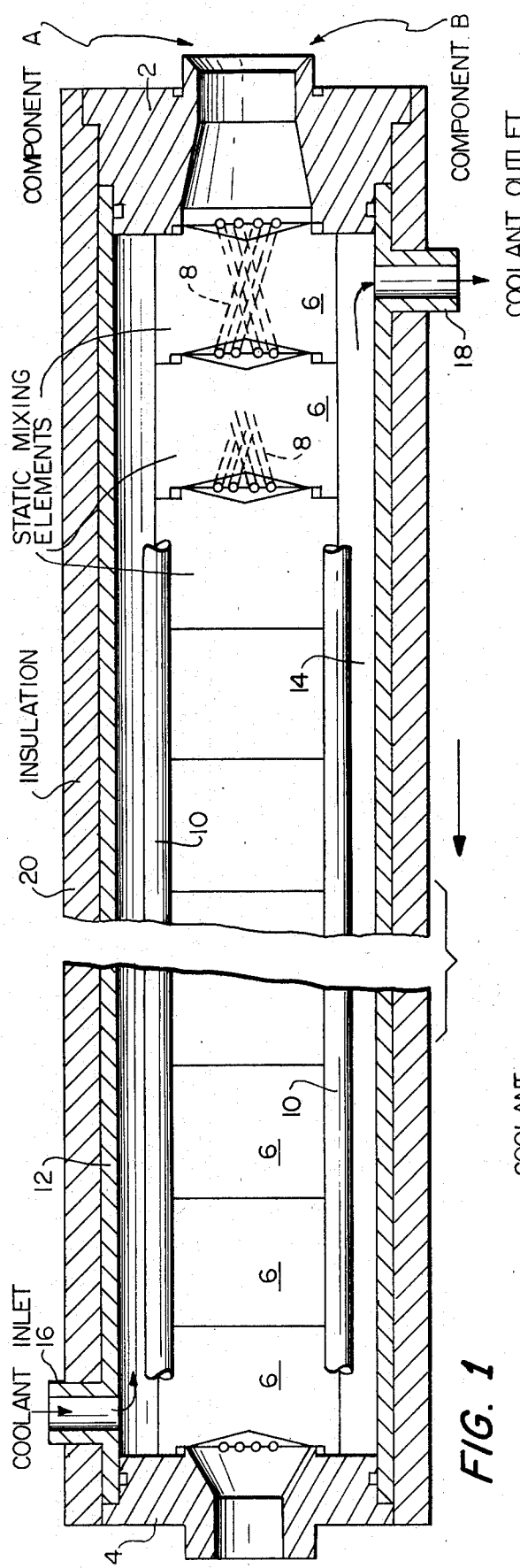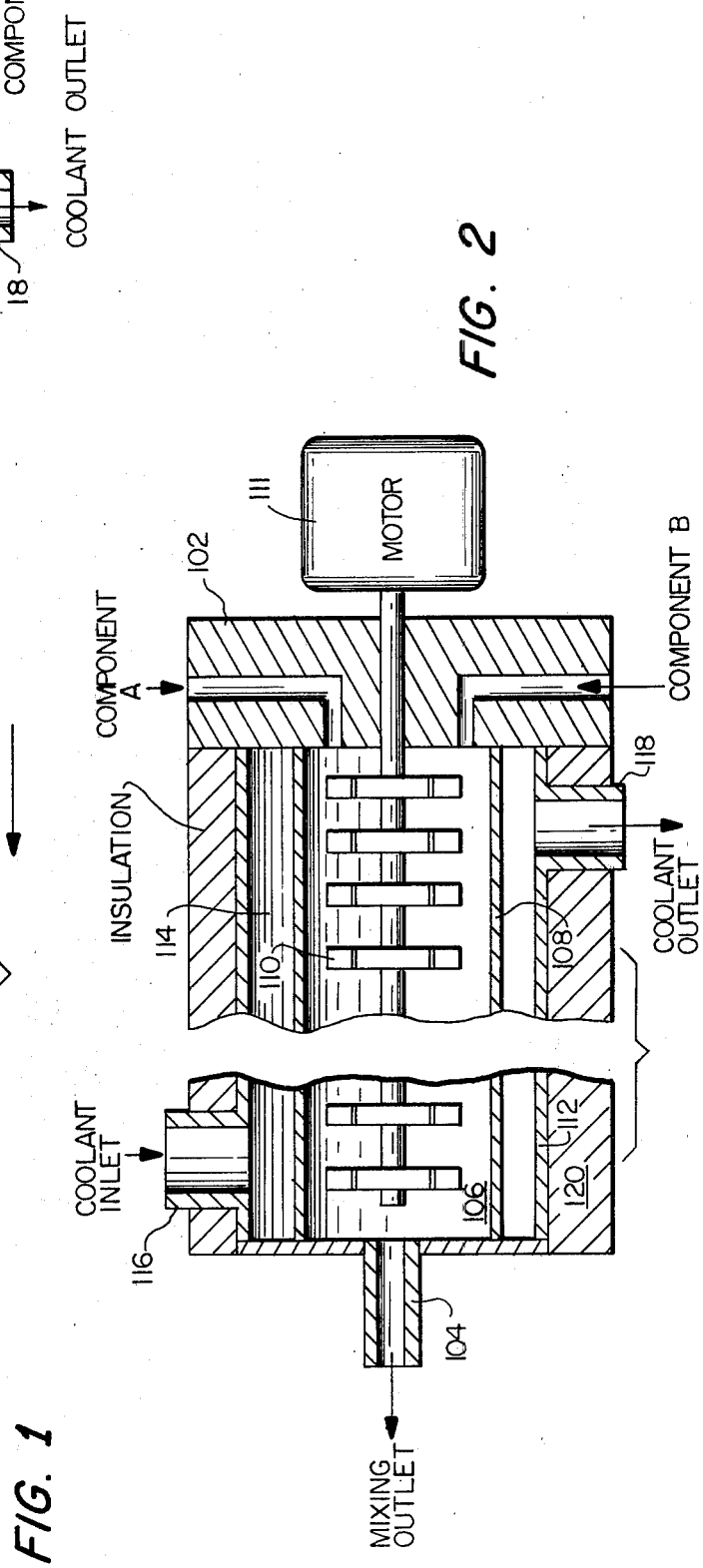

REACTION ARRESTMENT MIXER HEAD AND MIXING PROCESS

This application is a continuation of Ser. No. 107,612, filed Dec. 27, 1979, which is a division of Ser. No. 965,709, filed Nov. 30, 1978, both now abandoned.

BACKGROUND OF THE INVENTION

The present invention relates to an improved mixing process and apparatus of the type employed for the mixing of at least two fluid components of the type which when mixed together undergo chemical reaction to form a solid or semi-solid reaction product.

The use of multicomponent fluid reactive systems, generally liquid reactive systems, is well known and includes materials such as curable epoxy resins, curable polyurethane resins, curable polyester resins, curable silicone resins, curable polysulfide resins, curable phenolic resins and curable urea resins. These resins and their curing agents are known in the art. In the use of such materials, two or more fluid components, i.e. the resin and curing agent, for example liquid components, are mixed together in the required proportions, whereby the components undergo a chemical reaction resulting in a change of state, normally to a solid or semi-solid reaction product.

In most systems employing such materials, the reactive liquid starting components are internally mixed in mixing heads. Specifically, the reactive components are separately introduced into a mixer, the components are mixed within the mixer, at which time the chemical reaction begins, and the reaction mixture is discharged from the mixer prior to the completion of the chemical reaction and while still in a fluid state. After discharge from the mixer, the reaction mixture may be immediately employed in a production operation, for example a molding or injection operation to form a desired product.

The mixers employed in this type of operation are normally various known dynamic mechanical rotary mixers or mixers of the interfacial surface generator type. In the use of such mixers, the mixing operation is basically continuous. That is, for a given mixing operation, separate components are continuously introduced into the mixer and the reaction mixture is continuously discharged from the mixer.

It will be understood that whatever type mixer is employed, it is important that the reaction mixture be discharged from the mixer prior to the completion of the chemical reaction, i.e. before the "pot life" of the particular components is exceeded. If the chemical reaction is completed before the reaction mixture is discharged from the mixer, then the solid or semi-solid reaction product will jam the mixer.

Accordingly, when it becomes necessary to terminate a given mixing operation, for example at the end of a production run or at the end of a given production period, for example a work day or work week, it is current industrial practice to remove any remaining reaction mixture from the interior of the mixer. This is normally done by a manual or automatic flushing of the reaction mixture remaining in the mixer. This flushing normally necessitates the use of various solvents.

This present practice however has several distinct disadvantages. Specifically, if the flushing is carried out manually, then this requires a relatively skilled operator, inasmuch as the time allowed for achieving a flushing operation is relatively short. In the event that the operator makes an error and the chemical reaction is allowed to continue to completion within the interior of the mixer, then the mixer might well be permanently damaged. Even if the mixing system includes an automatic warning device to warn the operator upon shutdown of operation of the mixer, or even if the mixer includes an automatic flushing system, the flushing operation still represents a substantial operating cost. Specifically, flushing of the residual reaction mixture involves a wastage of the residual reaction mixture itself, in addition to a wastage of the solvents employed for the flushing operation. An additional disadvantage of this known system involves the increasing difficulty in providing a satisfactory manner of disposal of the resultant mixture of flushing solvent and residual reaction mixture. A further disadvantage of this known system is that storage of solvents presents a safety hazard, since many such solvents are flammable.

Thus, it will be apparent that known systems may not practically be employed for an intermittent flow movement of the components.

SUMMARY OF THE INVENTION

With the above discussion in mind, it is a primary object of the present invention to provide an improved mixing process and apparatus of the type described above whereby it is possible to avoid the need for the prior art flushing operation and the inherent disadvantages thereof.

It is a further object of the present invention to provide such a mixing process and apparatus whereby it is possible to selectively arrest the chemical reaction of the mixed components while the mixed components remain in the mixer, and to thereby prevent the formation of the solid or semi-solid reaction product within the mixer.

It is a still further object of the present invention to provide such an improved mixing process and apparatus whereby, after the chemical reaction has been arrested, it is possible to selectively stop the arrestment and allow the chemical reaction to continue.

It is a still even further object of the present invention to provide such an improved mixing process and apparatus whereby the chemical reaction of the mixed components within the mixer may be completely stopped by selectively cooling the reaction mixture within the mixer to a lowered temperature at which the chemical reaction will not occur, and thereafter heating the reaction mixtures within the mixer to an increased temperature at which the chemical reaction will continue.

It is a yet further object of the present invention to provide such a mixing process and apparatus whereby the chemical reaction of the mixed components within the mixer may be retarded or slowed down by selectively cooling the reaction mixture within the mixer to a lowered temperature at which the chemical reaction will continue, but at a reduced rate. If necessary or desirable, the reaction mixture within the mixer may thereafter be heated to increase the rate at which the chemical reaction will continue.

The above objects are achieved according to the present invention by the provision of a mixer of the type for mixing at least two fluid components which when mixed together undergo chemical reaction to form a solid or semi-solid reaction product. Means are provided for continuously separately introducing the components into the mixer, whereat the components are mixed, and for continuously discharging the reaction mixture from the mixer prior to the completion of the chemical reaction and while the reaction mixture is still in a fluid state. Further means are provided for, such as either upon the interruption of the continuous operation of the mixer or during continuous operation of the mixer, selectively arresting the chemical reaction of the reaction mixture while it remains in the mixer, and for thereby preventing formation of the reaction product within the mixer. In further accordance with the present invention, the arresting device includes means for selectively cooling the reaction mixture within the mixer to a lowered temperature at which the chemical reaction will not occur and for thereafter, if necessary or desirable, heating the reaction mixture within the mixer to an increased temperature at which the chemical reaction will continue.

In accordance with a specific embodiment of the present invention, the cooling and heating structure includes a heat exchange jacket surrounding the mixer. A heat exchange fluid is passed through the heat exchange jacket in intimate heat exchange contact with the mixer such that the mixed components undergo indirect heat exchange with the heat exchange fluid.

It is to be understood that in accordance with the present invention the term "arrest" is employed to mean either a retardation, i.e. a slowing down, or a complete stopping or termination of the chemical reaction. That is, in accordance with the present invention, the reaction mixture may be cooled to a temperature at which the chemical reaction is merely slowed down or retarded. However, in further accordance with the present invention, the reaction mixture may be further cooled to a temperature at which the chemical reaction is entirely stopped.

In further accordance with the present invention, the same or a different heat exchange fluid may be passed through the heat exchange jacket to selectively heat the reaction mixture back to a temperature at which the chemical reaction will be allowed to continue, i.e. either the ambient temperature existing before cooling or an intermediate temperature.

In accordance with a further feature of the present invention, the heat exchange jacket may surround a mixer which comprises a mixer of the interfacial surface generator type including a plurality of serially connected static mixing elements for repeatedly performing the successive operations of dividing a main fluid stream of the mixed components into plural substreams, of then reorienting such substreams, and of then recombining the substreams into a main fluid stream.

In accordance with a yet further specific embodiment of the present invention, the heat exchange jacket may surround a mixer which comprises a dynamic mechanical rotary mixer of the type including a wall defining a mixing chamber into which the components are separately supplied, a mixing rotor extending into the mixing chamber, and means for rotating the mixing rotor to thereby mix the components.

BRIEF DESCRIPTION OF THE DRAWINGS

Other objects, features and advantages of the present invention will be apparent from the following detailed description of preferred embodiments thereof, with reference to the accompanying drawings, wherein:

FIG. 1 is a schematic cross-sectional view of one embodiment of a reaction arrestment mixer head of the present invention, including a known mixer of the interfacial surface generator type; and FIG. 2 is a schematic cross-sectional view of a further embodiment of a reaction arrestment mixer head according to the present invention, and including a known dynamic mechanical rotary mixer.

DETAILED DESCRIPTION OF THE INVENTION

With reference now to FIG. 1 of the drawings, a first embodiment of the present invention will be described.

FIG. 1 illustrates a reaction arrestment mixer head according to the present invention and including a schematically shown known type of mixer of the interfacial surface generator type. Specifically, as is known in the art, a mixer of the interfacial surface generator type includes an inlet head 2 into which are separately introduced plural liquid reactive components, for example components A and B shown in FIG. 1, and an outlet head 4 from which are discharged the reaction mixture prior to the completion of the particular chemical reaction involved and while the reaction mixture is still in a liquid state, i.e. before it has reacted or gelled into a solid or semi-solid. Positioned between inlet head 2 and outlet head 4 are a plurality of static mixing elements 6 of known type and construction. Serially connected static mixing elements 6 each operate in a known manner to repeatedly perform the successive operations of dividing a main fluid stream of the mixed components into plural substreams, of then reorienting the substreams, and of then recombining the substreams into a main fluid stream. Such operations are achieved in a known manner, often by the provision of plural passageways 8 which are partially schematically shown only in the first two static mixing elements of FIG. 1. The precise configuration of static mixing elements 6, as well as their operation, are not further shown or described herein in detail, inasmuch as in and of themselves they do not form the present invention, and further inasmuch as they are well known by those skilled in the art. It is specifically intended that the present invention is adaptable to the use of any of the variously known mixers of the interfacial surface generator type, such as shown in Harder U.S. Pat. No. 3,394,924, Harder U.S. Pat. No. 3,404,869, Harder U.S. Pat. No. 3,406,947, Harder U.S. Pat. No. 3,583,678, and applicant's co-pending U.S. Application Ser. No. 896,017. To the extent necessary for a further understanding of the construction and operation of mixers of the interfacial surface generator type, the above mentioned disclosures are herein incorporated by reference. Further, as is conventional, inlet head 2, outlet head 4 and static mixing elements 6 may be held together by bolts 10 which are schematically shown in FIG. 1.

It will be apparent that if operation of the mixing head illustrated in FIG. 1 is interrupted, then the reaction mixture extending throughout the length of the mixing head must not be allowed to form into the particular solid or semi-solid reaction product. As discussed above, common practice in the art upon interruption of the operation of the mixing head is to flush out any reaction mixture remaining within the static mixing elements.

However, in accordance with the present invention, it is possible to interrupt the operation of the mixing head without flushing out any reaction mixture remaining within the mixing head. This is specifically done in accordance with the present invention by arresting the chemical reaction of the reaction mixture. As indicated above, as employed herein the term "arrest" may mean to completely stop or interrupt the chemical reaction, or alternatively to retard or slow down the chemical reaction.

This arresting is achieved according to the present invention by selectively cooling the reaction mixture within the static mixing elements to a selected lowered temperature at which the chemical reaction will not occur, or to a selected temperature at which the chemical reaction will continue, but at a reduced rate. Specifically, a heat exchange jacket, for example a metal jeacket 12 is provided to surround the static mixing elements 6. In the illustrated embodiment, jacket 12 is securely attached to inlet head 2 and outlet head 4 to define an annular space 14 between jacket 12 and static mixing elements 6. A heat exchange fluid inlet 16 is provided at one end of jacket 12, and a heat exchange fluid outlet 18 is provided at the opposite end of jacket 12. Thus, a heat exchange fluid may be introduced through inlet 16 into annular chamber 14, such that the heat exchange fluid passes in intimate heat exchange contact with the exterior surfaces of static mixing elements 6, and thereby in indirect heat exchange relationship with the reaction mixture within static mixing elements 6. This heat exchange will cool the mixed components remaining in the static mixing elements down to a temperature which will arrest the chemical reaction. The heat exchange fluid then exits through outlet 18. When it is desired to again continue the mixing operation, then the same or a different heat exchange fluid may be passed through chamber 14 within jacket 12 to thereby heat the static mixing elements 6 and the reaction mixture therein, until the reaction mixture is raised to a desired temperature at which the chemical reaction will again commence and continue during further mixing and passage of the reaction mixture through the static mixing elements to discharge head 4. It is to be understood that the cooling and heating operations will be sufficient to cool and heat any reaction mixture remaining in discharge head 4.

The above embodiment described with regard to FIG. 1 employs a mixer of the interfacial surface generator type, i.e. a mixer which does not include moving elements. The use of such mixers is particularly suitable for the present invention, inasmuch as the density of the reaction mixture remaining in the static mixing elements is relatively low.

However, it is to be understood that the present invention is also employable with mixing heads of the dynamic mechanical rotary type. Reference will now be made to FIG. 2 of the drawings wherein the present invention will be described with reference to the use of a dynamic mechanical rotary mixer which includes an inlet head 102 through which plural reactive components, for example components A and B are separately introduced into a mixing chamber 106 defined by a wall 108. An outlet 104 is provided for the discharge of the reaction mixture prior to the completion of the chemical reaction and while still in a liquid state. A mixing rotor 110 is provided within mixing chamber 106, and means, such as motor 111, rotates mixing rotor 110 to thereby mix components A and B and the resultant reaction mixture prior to the discharge thereof through outlet 104. It is to be understood that any known type of dynamic rotary mixing head may be employed within the present invention, and one example of such a rotary mixing head which may be employed is the "MkIII Rotary Mixing Head" manufactured by Liquid Control Limited.

In accordance with this embodiment of the present invention, a heat exchange jacket 112 surrounds wall 108 to define therebetween an annular chamber 114. A heat exchange fluid is introduced through inlet 116 and passes through annular chamber 114 and is then discharged through outlet 118. While in chamber 114, the heat exchange fluid will directly cool wall 108 and thereby indirectly cool the reaction mixture remaining within chamber 106. Thereby, when desired, for example during interruption of the operation of the mixing head, reaction mixture remaining within chamber 106 may be cooled to a temperature at which the chemical reaction is arrested. Thereafter, when it is desired to again commence the mixing operation, the same or a further heat exchange fluid may be passed through chamber 114 within jacket 112 to thereby heat wall 108 and reaction mixture within chamber 106 to a selected increased temperature at which the chemical reaction will continue. It is to be understood that the cooling operation in the embodiment of FIG. 2 will be sufficient to arrest the chemical reaction of any reaction mixture remaining in outlet 104.

In both illustrated embodiments of the present invention, the elements of the mixing head which come into direct contact with the heat exchange fluid and the reaction mixture should be of a material which has good heat transfer properties, for example aluminum.

The heat exchange fluid employed may be any heat exchange fluid which is conventionally employed for heat exchange purposes. One specific material which has been employed in accordance with the present invention is glycol, but it will be understood by those skilled in the art that many other specific heat exchange fluids may be employed.

Further, the specific manner of storage, supply and recycling of the heat exchange fluid has not been described or illustrated herein, inasmuch as it is intended that conventional such means known in the heat exchange art be employed. For example, the overall heat exchange system of the present invention could employ a coolant fluid for the cooling operation and a separate heating fluid for the heating operation, or alternatively could employ the same fluid which is recycled by a separate heat exchanger in a known manner. Also, although the flow of heat exchange fluid is shown to be in a direction opposite to the mixing direction, the reverse could be the case. Also, the direction of movement of the cooling fluid could be opposite to the direction of movement of the heating fluid. Various other conventional modifications and alternatives are intended to be within the scope of the present invention.

Furthermore, for heat exchange efficiency, the heat exchange jackets may be covered by a layer of suitable insulation. For example, insulating layer 20 is schematically shown in FIG. 1, and insulating layer 120 is schematically shown in FIG. 2.

It will further be understood that the temperature to which a given reaction mixture within a given mixing head structure is to be cooled to arrest the particular chemical reaction involved will to a large extent depend upon obvious parameters, such as the particular reactive components involved. Practical experience has determined that a reduction to a temperature of $-15°$ C. will stop the chemical reaction of most practical examples of mixed components within a mixing head. It is to be understood however that the present invention is not intended to be limited to a specific temperature or temperature range, but rather that the present invention is directed to the cooling of the particular reaction mixture involved to a temperature at which the chemical reaction thereof will be arrested.

Additionally, it will be understood that the time necessary to arrest the chemical reaction by cooling, as well as the time necessary to again commence the chemical reaction by heating, will be substantially dependent upon various parameters such as the particular reactive components involved, the cooling fluid employed, the material of the mixing head, etc. It has however been found by practical experience that the chemical reactions of all practical examples of mixed reactive components may be completely stopped within a time of three minutes. It should be understood however that it is not intended to limit the present invention to any particular time or time range.

Practical experience has also shown that when the chemical reaction has been stopped, the arrestment is substantially permanent without any practical time limitation. It has specifically been found that when the chemical reaction has been stopped for a considerable length of time, the reaction may be again continued by heating the reaction mixture in the manner described above.

Accordingly, it will be apparent that in accordance with the improved mixing process and apparatus of the present invention, when the mixing operation is interrupted, it may be totally unnecessary to flush out any reaction mixture remaining in the mixing head. This makes it possible to completely eliminate the disadvantages of the prior art.

It will be appreciated from the above discussion that the novel features of the present invention may be employed in a great variety of different ways to thereby very substantially increase the flexibility of operation during the mixing of at least two fluid components of the type which when mixed together undergo chemical reaction to form a solid or semi-solid reaction product.

A primary use of the present invention will obviously be to completely stop the chemical reaction of the reaction mixture during a temporary interruption of the continuous operation of a mixer, or during the shutdown of the mixer at the end of an operating day. That is, by cooling the reaction mixture to a temperature at which the chemical reaction is completely stopped, the continuous mixing operation may be interrupted for as long a period as desired and thereafter continued when desired.

However, by the novel features of the present invention, the chemical reaction of the reaction mixture may merely be retarded, such that the chemical reaction continues, but at a reduced rate. It will be apparent to those skilled in the art that this practical embodiment of the present invention has many applications.

Further, whether the cooling is to a degree sufficient to completely stop the chemical reaction or merely to retard the chemical reaction, the reaction mixture may thereafter be heated to a desired degree to thereafter allow the chemical reaction to again commence or to continue at an increased rate. The increased temperature may be back to the original ambient temperature or to a lower or higher temperature, as desired.

It will further be apparent that in accordance with the present invention the reaction mixture may be cooled, either to a temperature to completely stop the chemical reaction or to a temperature to merely retard the chemical reaction, while the reaction mixture is being continuously moved through the mixer, i.e. without an interruption in the operation of the mixer. This practical embodiment of the invention is useful when it is desired to substantially or entirely avoid the chemical reaction, such as when the reaction mixture is to be stored at a reduced temperature after discharge from the mixer, so that it may be employed at a substantially later time for its intended use.

It is further to be understood to be within the scope of the present invention that the feature of arresting the chemical reaction of the reaction mixture may be employed in conjunction with a known flushing operation. Thus, the reaction mixture may be periodically cooled to arrest the chemical reaction during a normal production operation as desired, but at the end of an operating day or week the mixer may be flushed in the normal manner.

Thus, it will be apparent that the feature of the present invention greatly increase the practical applications and uses of mixing processes and apparatuses of the type employed for the mixing of at least two fluid components of the type which when mixed together undergo chemical reaction to form a solid or semi-solid reaction product.

Although the present invention has been described and illustrated with regard to specific structural arrangements and manipulative operations, it is to be understood that various modifications may be made to such specific operations and structural features without departing from the scope of the present invention.

What I claim is:

1. In a process for mixing and then reacting at least two fluid components of the type which when mixed together undergo chemical reaction to form a solid polymeric final reaction product, said process including separately introducing said components into a mixer and therein mixing and reacting said components, and discharging the resultant reaction mixture from said mixer prior to final completion of said chemical reaction and while said reaction mixture is still in a fluid state, the improvement comprising:

cooling said reaction mixture within said mixer to a lowered temperature at which said chemical reaction will be retarded or will not occur, thereby preventing the formation of said solid reaction product within said mixer, and thereafter heating said reaction mixture within said mixer to increase the reaction rate of said chemical reaction.

2. The improvement claimed in claim 1, wherein said chemical reaction is completely stopped.

3. The improvement claimed in claim 1, wherein said chemical reaction is retarded.

4. The improvement claimed in claim 1, wherein said mixer is surrounded by a heat exchange jacket, and wherein said cooling and heating comprises passing a heat exchange fluid through said heat exchange jacket in intimate heat exchange contact with said mixer and in indirect heat exchange relationship with said reaction mixture.

* * * * *